United States Patent
Biewer et al.

(10) Patent No.: US 7,189,450 B2
(45) Date of Patent: Mar. 13, 2007

(54) FOAMED VEHICLE COMPONENT AND METHOD OF PRODUCING A FOAMED VEHICLE COMPONENT

(75) Inventors: Christian Biewer, Altheim (DE); Michael Jugl, Sulzbach (DE); Matthias Ludwig, Vechelde (DE)

(73) Assignee: ArvinMeritor GmbH (DE)

( * ) Notice: Subject to any disclaimer, the term of this patent is extended or adjusted under 35 U.S.C. 154(b) by 0 days.

(21) Appl. No.: 11/169,434

(22) Filed: Jun. 29, 2005

(65) Prior Publication Data

US 2006/0019086 A1  Jan. 26, 2006

(30) Foreign Application Priority Data

Jul. 22, 2004   (DE)   ................ 10 2004 035 473

(51) Int. Cl.
*B32B 3/28* (2006.01)
(52) U.S. Cl. .................... 428/304.4; 296/210
(58) Field of Classification Search ............ 428/304.4, 428/318.4; 296/210, 214
See application file for complete search history.

(56) References Cited

U.S. PATENT DOCUMENTS

| | | | | |
|---|---|---|---|---|
| 5,120,593 A * | 6/1992 | Kurihara | .................... | 428/174 |
| 6,070,902 A * | 6/2000 | Kowalski et al. | ......... | 280/730.2 |
| 6,378,936 B1 * | 4/2002 | Grimm et al. | ............... | 296/214 |
| 6,619,731 B2 * | 9/2003 | Rieger et al. | ................ | 296/214 |
| 7,000,980 B2 * | 2/2006 | Lutz et al. | ................... | 296/214 |
| 2001/0003400 A1 * | 6/2001 | Grimm et al. | ............... | 296/210 |
| 2002/0167203 A1 * | 11/2002 | Rieger et al. | ................ | 296/214 |
| 2003/0230044 A1 * | 12/2003 | Peterson | .................... | 52/716.5 |

FOREIGN PATENT DOCUMENTS

| | | |
|---|---|---|
| DE | 101 33 894 A1 | 1/2003 |
| DE | 102 23 579 A1 | 11/2003 |

OTHER PUBLICATIONS

European Search Report, Nov. 15, 2005.

* cited by examiner

*Primary Examiner*—H Gutman
(74) *Attorney, Agent, or Firm*—Carlson, Gaskey & Olds

(57) ABSTRACT

A foamed vehicle component has a foamed main component and an insert. The insert serves as a fastening element and is embedded in the foamed main component by foaming. The insert, in a portion embedded in the foamed main component, is surrounded at least in sections by an elastic intermediate component. Pliability of the elastic intermediate component is larger than that of the foamed main component, so that the insert is resiliently supported in the foamed main component.

14 Claims, 2 Drawing Sheets

FOAMED VEHICLE COMPONENT AND METHOD OF PRODUCING A FOAMED VEHICLE COMPONENT

BACKGROUND OF THE INVENTION

The application claims priority to German Application No. 10 2004 035 473.1, filed Jul. 22, 2004.

The invention relates to a foamed vehicle component comprising a foamed main component and an insert that serves as a fastening element, and which is embedded in the foamed main component by foaming. The invention also relates to a method of producing the foamed vehicle component.

Foamed vehicle components, particularly components with a fiber-reinforced polyurethane (PU) material, are already known, with glass fibers being injected in plastic using a long fiber injection (LFI) method. The use of inserts in foamed vehicle components is also known. The inserts serve to attach various operating elements or serve to fasten vehicle components. With known foamed vehicle components, however, there is the risk that sink marks, dents or bumps will form on a surface that is visible from outside. These surface marks are caused by differing expansion coefficients of the inserts and associated foamed backing. These sink marks can be seen from outside and thereby significantly deteriorate surface quality.

The invention solves this problem and provides a vehicle component that has a very good surface quality, despite the incorporation of inserts, and which provides a simple method of producing the vehicle component.

SUMMARY OF THE INVENTION

The invention solves these above-mentioned problems by providing a generic vehicle component with a main component and an insert. A portion of the insert that is embedded in the main component, is surrounded at least in sections by an elastic intermediate component, the pliability of which is larger than that of the main component, so that the insert is resiliently supported in the main component. One advantage achieved with the invention of the subject foamed vehicle component is that the inserts will not become apparent from outside. The inserts usually have a higher thermal expansion coefficient than the main component, which can cause undesirable marks to be formed on a visible outer surface. However, the invention provides a surface that does not have any sink marks, dents or bumps, because existing differing thermal expansion coefficients of various materials of insert and foamed backing are compensated for by the elastic intermediate component. Thus, a compensation of tolerances is ensured both during a foaming process and in a mounted state.

Further, a sealing effect between the foamed backing and insert is improved, which is achieved without employing elastic seals that were traditionally provided for sealing purposes, but which were subject to constant wear. The insert is accessible from outside and preferably is partially exposed. Additionally, due to the use of the elastic intermediate component, it is also possible to fasten parts such as driving motors and actuating motors to the insert. This allows such motors to be mounted to the main component such that these motors are generally separated from the main component with respect to oscillations, so that vibration transmission to the main component is reduced.

Preferably, the vehicle component is a car body attachment part, in particular a roof module. Car body attachment parts are such parts that are mounted to the car body. The invention especially relates to those attachment parts which define an outer skin of a vehicle in an after final assembly state, and which are visible from outside. Such car body attachment parts should be light-weight, visually adapted to adjoining lacquered components, and have a very good surface quality. Particularly in the field of roof modules, which includes roof modules having a sliding roof unit or lamella roofs, plastic composite parts have increasingly proven to be particularly advantageous. Other attachment parts to which the present invention may also be applied, are fenders, doors and flaps (hood, trunk lid, gas cap) of motor vehicles.

Further, the elastic intermediate component is preferably configured such that the elastic intermediate component gives the insert mobility in all directions relative to the main component. This provides compensation of tolerances because, during fastening, the insert is allowed to adapt to the position of an adjoining component, which again ensures a very good surface quality. The insert can perform movements in a translational (axial, radial) direction, which will be present in the case of designing the insert for mounting various operating elements of lighting devices or the like, or to a limited extent in rotational direction. In particular a tilting movement is possible when the insert is designed as a fastening element of a roof module on a car body, because of large positional tolerances of fastening holes on a car body side.

The elastic intermediate component of the vehicle component is preferably applied by foaming or injection-molding.

The insert is thickened at one end that is embedded in the main component. The main component or the elastic intermediate component engages behind this end. This makes sure that the insert is additionally secured against a pulling out in an axial direction.

The main component preferably has a rear side at which the insert is partially exposed. The elastic intermediate component forms a sealing lip projecting outwardly with respect to the main component. Required sealing was traditionally obtained by elastic sealing means or the like, which were provided at this rear side, and which were subject to constant wear. In the embodiment shown, such sealing is ensured at low costs. Improved sealing is provided by the sealing lip that extends around the insert in a closed ring-shape.

According to the preferred embodiment, a front side of the main component is covered by a deep-drawn foil, and is produced by providing the deep-drawn foil with a foamed backing. This deep-drawn foil is a plastic or aluminum foil, with the plastic foil preferably being imbued so that an external coat of lacquer may be eliminated. An outer skin of aluminum is provided, for instance, with a very thin, imbued plastic layer. This is why the external coat of lacquer can be eliminated and thus a low-cost manufacturing is provided.

In one embodiment the insert has a threaded bolt section projecting from the main component, so that the insert can be fastened to the car body. Such inserts may also be hollow bodies, such as threaded bushings, for example. The inserts may also serve for fastening additional attachment parts, for instance roof opening systems, guides for electrical lines, or devices such as illumination devices, supporting straps, air bags etc.

The invention may not only be used for roof modules, but also for hard tops, interior roof linings, and other vehicular external or internal lining, planking and structural components, by applying a foamed backing made by the known LFI method.

The method according to the invention of producing a foamed vehicle component, in particular a car body attachment part, includes the following steps.

An insert serving as a fastening element has at least one section encased in an intermediate component made of a material that has a larger pliability than a main component.

A resultant unit of the insert and the intermediate component is introduced in a foaming tool and is embedded in foam, at least in sections, such that in a cured state the insert is elastically and resiliently supported relative to the main component.

In the process, mounting the intermediate component to the insert is accomplished by directly applying foam on the insert by foaming or injection-molding. Subsequently this unit will be introduced in one piece in the foaming tool.

These and other features of the present invention can be best understood from the following specification and drawings, the following of which is a brief description.

DETAILED DESCRIPTION OF THE PREFERRED EMBODIMENT

Figure 1:
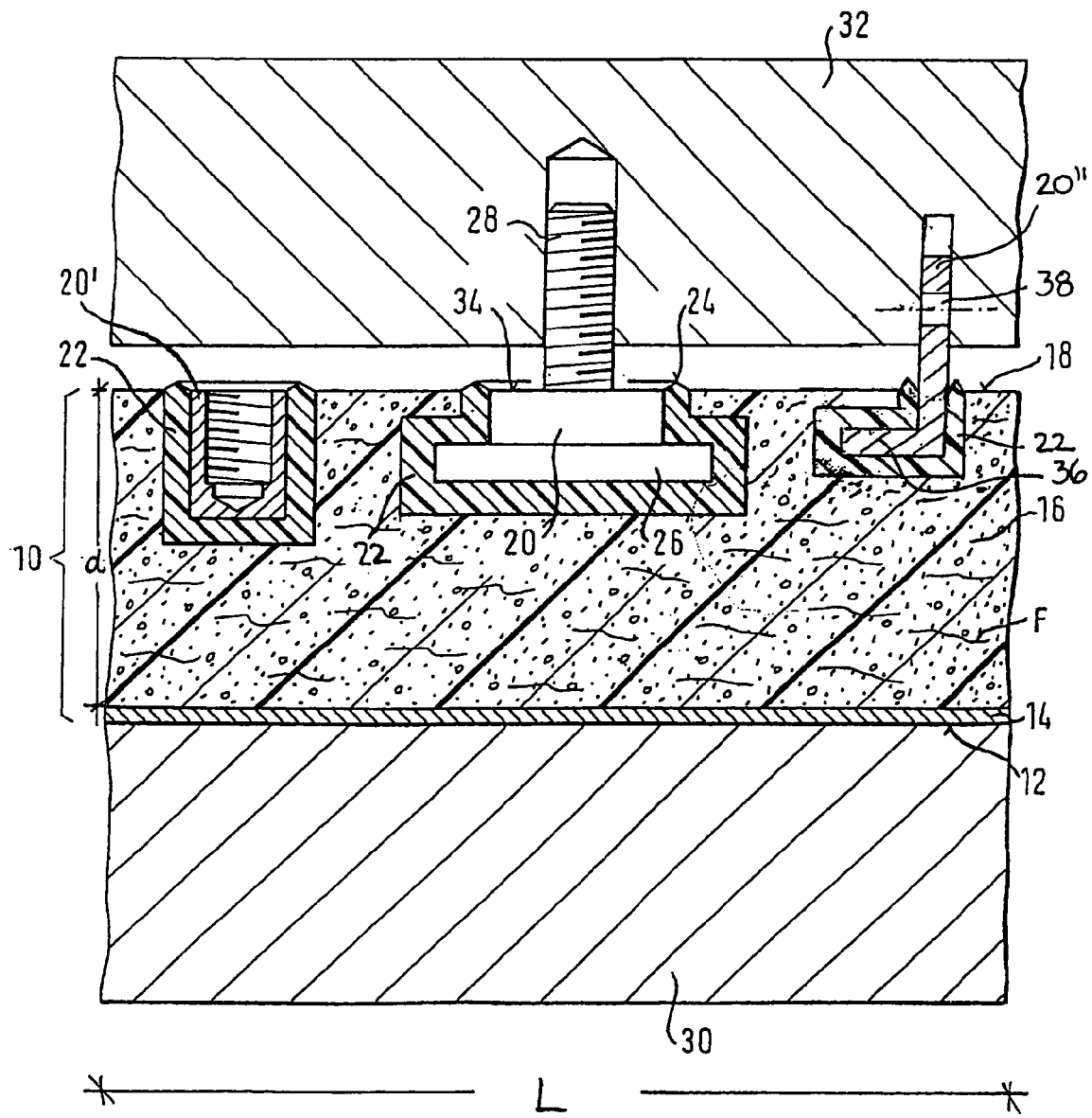
FIG. 1 shows an enlarged sectional view through the foamed vehicle component in the foaming tool, with the upper part of the foaming tool being already slightly lifted.

FIG. 1 illustrates a foamed vehicle component 10 in the form of a car body attachment part, in particular a roof module. A front side, which in an installed condition can be seen from outside, is referenced by 12. The front side 12 of the foamed vehicle component 10 is provided with a very thin (<1.5 mm) deep-drawn foil 14 that consists of plastic or aluminum, and which is preferably imbued in order to replace an external coat of lacquer. Directly adjoining the deep-drawn foil 14 is a main component 16 including a fiber-reinforced PU foam. Glass fibers F are impregnated in foam by a long fiber injection (LFI) method to reinforce the layer formed by the main component 16.

In FIG. 1 the main component 16 has a constant thickness d across an entire length L, which is shown, but can also be configured to have a varying thickness. On a rear side 18 of the foamed vehicle component 10 there can be applied a decorative part made of textile, plastics, such as an aluminum (Al) or iron (Fe) sheet (not shown). An insert 20 of metal is surrounded by an intermediate component 22 of an elastic material, and is embedded in the main component 16. In FIG. 1 the intermediate component 22 is continuously surrounded by the elastic material without any gap, but it would also be possible to have an intermediate component that is only partially surrounded in sections by the elastic material. Through the larger pliability of the intermediate component 22 with respect to the main component 16, the insert 20 is permitted to have a certain mobility in all directions relative to the main component 16.

A sealing lip 24 that surrounds the insert 20 in a closed ring-shape ensures that during foaming of the main component 16 no foam can enter the space between an upper part 32 of a foaming tool and the insert 20. When the foaming tool is closed, a rear side of insert 20 has full surface contact with the upper part 32. The sealing lip 24 is formed by a bead of the intermediate component 22, which is triangular in cross-section, and projects with respect to the rear side of the insert 20. The required tightness is thus achieved without any additional elastic seals or the like, which were traditionally provided on the upper part 32 and were subject to constant wear.

In this embodiment, the insert 20 has a thickened end 26 at the embedded portion. The main component 16 and the intermediate component 22, respectively, engage behind this thickened end 26 and thereby additionally fix the insert 20 against being pulled out. Also in this embodiment, the insert 20 has a projecting threaded bolt section 28. Other embodiments for the insert 20 are also conceivable, as mentioned initially.

FIG. 1 further illustrates the foaming tool that produces the foamed vehicle components 10 such as the initially mentioned roof modules, doors and flaps etc. The foaming tool includes upper and lower parts 32 and 30, respectively, which when moved towards each other form a hollow space that can be filled with plastic material.

In the method of producing a foamed vehicle component 10, the deep-drawn foil 14 is inserted into the lower part 30. If desired, a decorative foil (not shown) can be placed on an underside of the upper part 32. Subsequently, a unit including the insert 20 and the intermediate component 22 is fastened to the upper part 32. The intermediate component 22 is produced in advance directly on the insert 20 by a foaming or injection-molding process. The threaded bolt section 28 projects into a positioning hole in the upper part 32, and the sealing lip 24 and a planar rear portion 34 press against the upper part 32.

When the foaming tool is open, liquid PU material is applied on a rear side of the deep-drawn foil 14, with glass fibers also being injected by the LFI method. The upper and lower parts 32, 30 are moved towards each other. The PU material converts into foam and fills up the hollow space forming between the upper and lower parts 32, 30, which after foaming constitutes the main component 16.

The insert 20 is movably embedded in a foamed plastics layer that forms the main component 16 by the intermediate component 22 and is able to move in all directions by a certain distance, in order to compensate for the differing expansions of the various materials. This is accomplished by the elastic material of the intermediate component 22, and occurs during and after foaming as well as after installation.

In FIG. 1 there is shown a further insert 20' in the form of a threaded bushing made of metal, which likewise is embedded in an intermediate component 22. The unit of intermediate component 22 and insert 20' again is embedded in the main component 16.

In FIG. 1 there is also shown an insert 20" in a third embodiment comparable with an angle support, because the insert 20" has a bent end 36 and a projecting section with a cylindrical recess 38, in which a fastening element (not shown) can engage. The bent end 36 is embedded in the main component 16. The insert 20" may serve for fastening additional attachment parts, for instance, illumination devices, supporting straps, sun visors etc.

Figure 2:
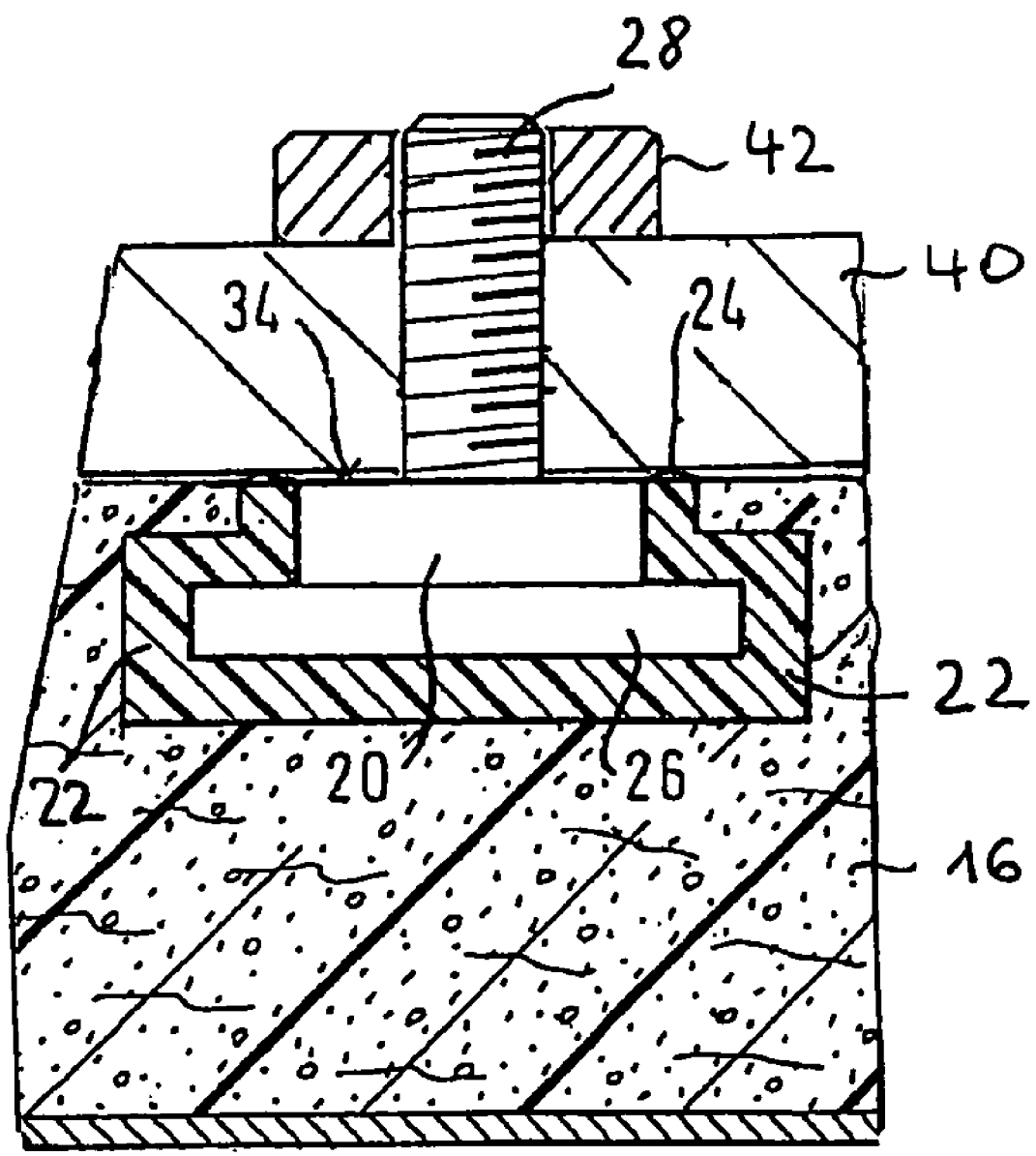
FIG. 2 shows the foamed vehicle component with a flange-mounted driving motor.

The embodiment of FIG. 2 shows an electric driving motor or actuating motor fixed to the insert 20 by a motor flange 40. A nut 42 serves as an arresting part to securely mount the motor flange 40 to the insert 20. The driving motor or actuating motor is thus mounted to the main component 16 such that the driving or actuating motor is generally separated therefrom with respect to oscillations. This is a result of the use of the intermediate component 22 and the sealing lip 24, which provides for a distance between the motor flange 40 and the main component 16.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A foamed vehicle component, comprising:
   a foamed main component; and
   an insert serving as a fastening element and having at least one portion embedded in the foamed main component by foaming wherein the at least one portion is surrounded at least in sections by an elastic intermediate component that has a pliability that is larger than that of the foamed main component, such that the insert is resiliently supported in the foamed main component.

2. The foamed vehicle component according to claim 1 wherein the foamed vehicle component is a car body attachment part.

3. The foamed vehicle component according to claim 2 wherein the car body attachment part comprises a roof module.

4. The foamed vehicle component according to claim 1 wherein the elastic intermediate component is configured such that the elastic intermediate component gives the insert mobility in all directions relative to the foamed main component.

5. The foamed vehicle component according to claim 1 wherein the elastic intermediate component is applied by one of foaming and injection-molding.

6. The foamed vehicle component according to claim 1 wherein the at least one portion of the insert has a thickened end embedded in the foamed main component and wherein the foamed main component engages behind the thickened end.

7. The foamed vehicle component according to claim 1 wherein the at least one portion of the insert has a thickened end embedded in the foamed main component and wherein the elastic intermediate component engages behind the thickened end.

8. The foamed vehicle component according to claim 1 wherein the foamed main component has a rear side at which the insert is partially exposed, and the elastic intermediate component forms a sealing lip projecting outwardly with respect to the foamed main component.

9. The foamed vehicle component according to claim 1 wherein the elastic intermediate component forms a sealing lip projecting outwardly with respect to the foamed main component and wherein the sealing lip extends around the insert in a closed ring-shape.

10. The foamed vehicle component according to claim 1 wherein a front side of the foamed main component is covered by a deep-drawn foil and the foamed main component is produced by providing the deep-drawn foil with a foamed backing.

11. The foamed vehicle component according to claim 1 wherein the insert has a threaded bolt section projecting from the main foamed component.

12. The foamed vehicle component according to claim 1 wherein the insert is a threaded bushing.

13. The foamed vehicle component according to claim 1 wherein the foamed main component is manufactured by a long fiber injection foaming method.

14. The foamed vehicle component according to claim 1 wherein the insert includes a fastening portion that is adapted for attachment to a drive motor flange.

* * * * *